April 23, 1963   D. G. SAMUEL ETAL   3,086,327
REFRACTORY UNIT FOR FURNACE-LINING CONSTRUCTION
Filed March 13, 1958   3 Sheets-Sheet 1
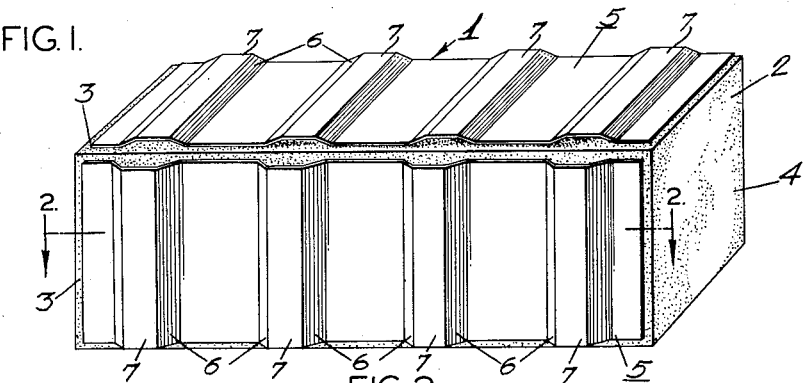
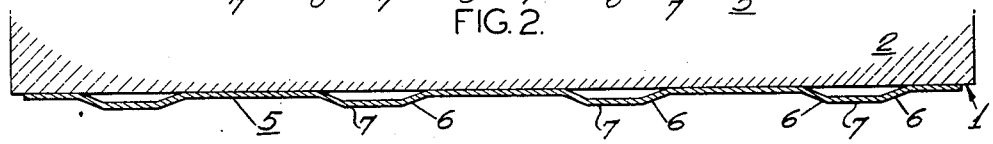
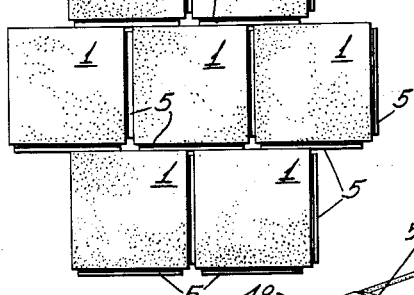
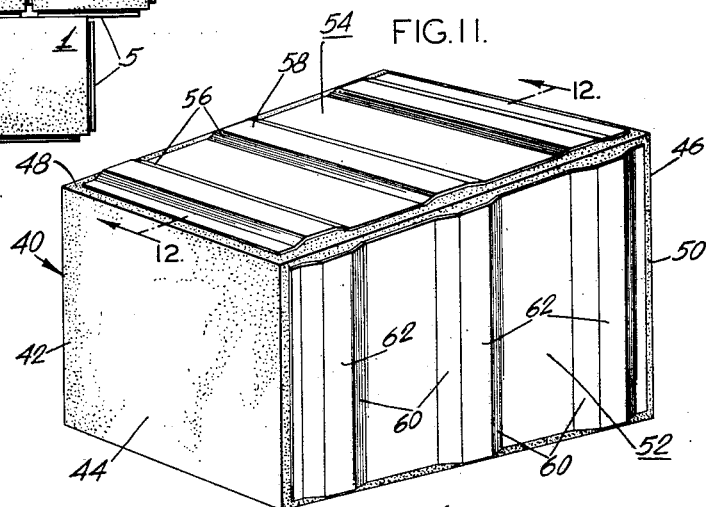
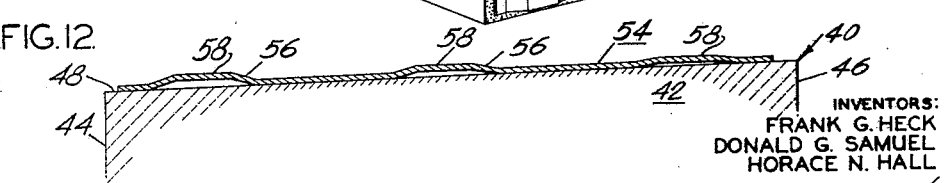
INVENTORS:
FRANK G. HECK
DONALD G. SAMUEL
HORACE N. HALL
BY Howson & Howson
ATTYS.

April 23, 1963 D. G. SAMUEL ETAL 3,086,327
REFRACTORY UNIT FOR FURNACE-LINING CONSTRUCTION
Filed March 13, 1958 3 Sheets-Sheet 2
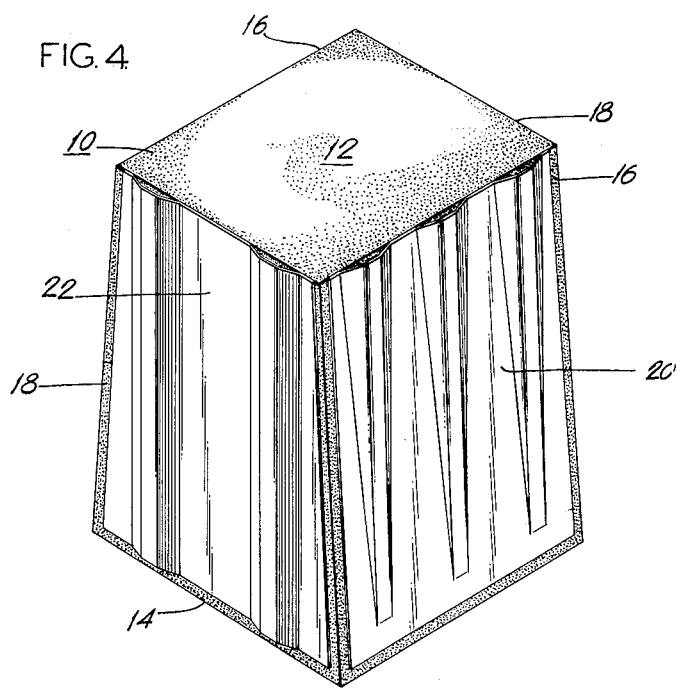
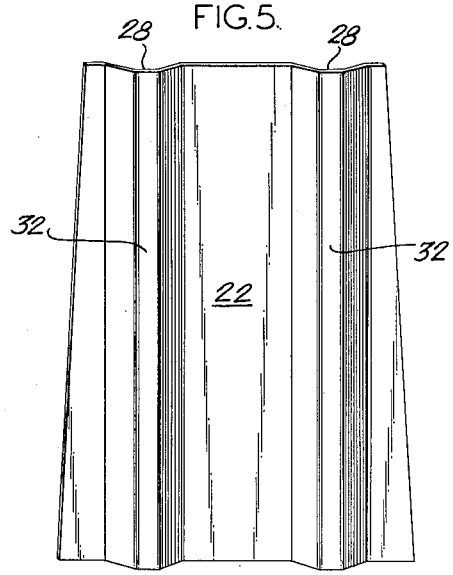
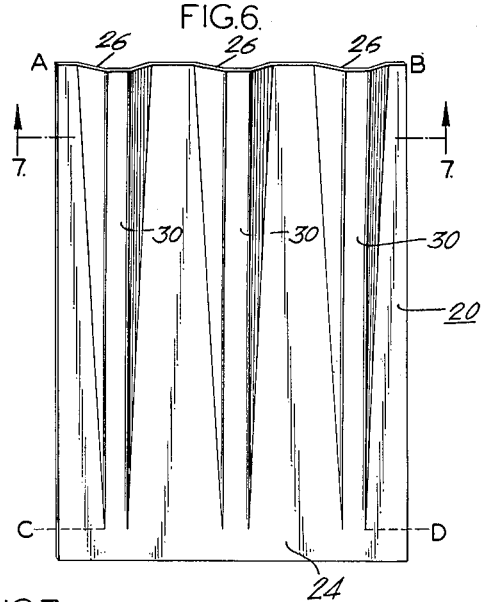
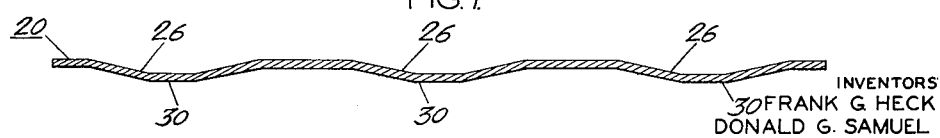
INVENTORS
FRANK G. HECK
DONALD G. SAMUEL
HORACE N. HALL
BY Howson & Howson
ATTYS.

April 23, 1963 D. G. SAMUEL ETAL 3,086,327
REFRACTORY UNIT FOR FURNACE-LINING CONSTRUCTION
Filed March 13, 1958 3 Sheets-Sheet 3
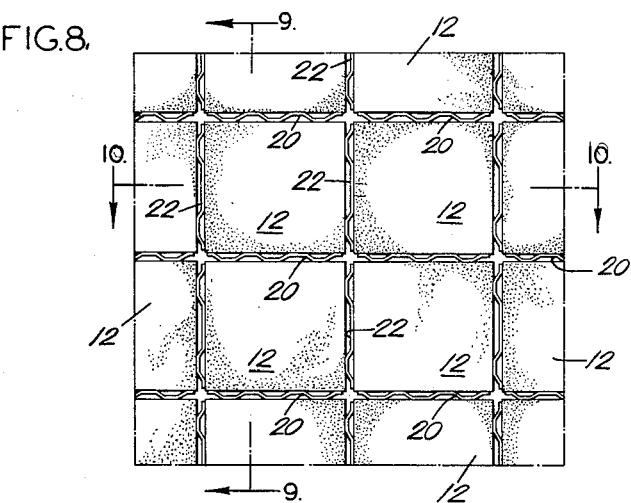
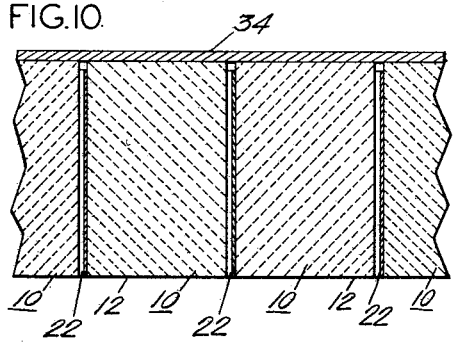
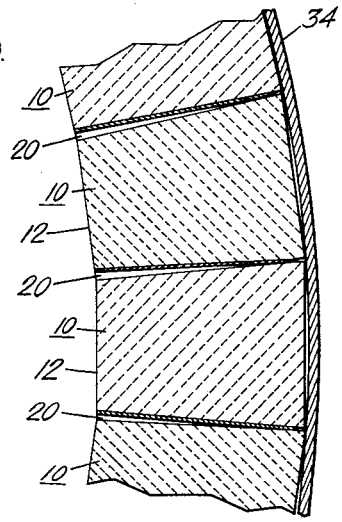
INVENTORS:
FRANK G. HECK
DONALD G. SAMUEL
HORACE N. HALL
BY Howson & Howson
ATTYS.

United States Patent Office 3,086,327
Patented Apr. 23, 1963

3,086,327
REFRACTORY UNIT FOR FURNACE-LINING CONSTRUCTION
Donald G. Samuel, Norristown, Frank G. Heck, Prospectville, and Horace N. Hall, Collegeville, Pa., assignors to E. J. Lavino and Company, Philadelphia, Pa., a corporation of Delaware
Filed Mar. 13, 1958, Ser. No. 721,195
6 Claims. (Cl. 50—162)

This invention relates to furnace-lining construction and more particularly, to novel refractory units which provide for greatly simplified installation and improved compensation for expansion in furnaces operated at elevated temperatures.

In furnace structures designed for high temperature operations there has always been the problem of providing adequate relief for expansion of the refractory bricks, especially where such bricks comprise a basic refractory material, such as chrome ore, magnesite, mixtures thereof, and the like, in either a burned or unburned condition. At high temperatures such expansion generally arises from one or more of three main sources, namely: thermal expansion of the refractory, crystalline growth by oxidation of any metal plates inserted between bricks to cement the brickwork into a monolithic structure at high temperatures, and increase in dimensions of brick ends exposed to the interior of the furnace by alteration of the brick composition through reaction with the hot contents of the furnace. Thermal expansion occurs immediately upon heating up of the furnace, while the last two mentioned types of expansion generally develop over extended periods of operation. Expansion resulting from any of these sources is greater at the hot face of the refractory than at the colder end.

In vertical furnace linings, the general practice has been to provide a construction which permits the entire wall to freely expand in an upward direction. Vertical joints, which either are open or filled with a combustible material, such as paper or cardboard, are provided at frequent intervals to allow for horizontal expansion.

Such construction has a number of shortcomings. Because expansion is greatest at the hot faces of the brick the major portion of the wall weight is shifted to the hot ends of the brick which portions of the brick have the least strength. As expansion, due to crystalline growth if any metal plates are present in the structure, or due to alteratiton of brick composition by the contents of the furnace, takes place, the excessive loading of the hot ends of the bricks results in buckling, shearing and other phases of mechanical failure of the wall structure.

Open joints and joints containing combustible material provide for adequate initial thermal expansion in a horizontal direction, provided care is taken to properly space such joints. However, it is not practical to provide for long term growth in this manner since it is essential that the open joints close tightly upon initial heating to prevent cold air infiltration and resulting low furnace efficiency.

In construction of curved sections of furnace-linings, such as for example the lining of a rotary kiln, with wedge-shaped refractory blocks, where oxidizable metal plates are inserted in radial joints to weld the wall or furnace-lining into a monolithic structure on heating to high temperatures, it has often been necessary to introduce a substantial number of such plates into a single joint to tighten the cold brickwork. This use of excessive metal plates causes severe expansion due to crystalline growth and undesirable buckling and shearing of the brickwork.

Another disadvantage of the prior methods of constructing furnace-linings where metal plates or combustible spacing members have been employed resides in the fact that a plurality of separate materials is required. For example, separate stock piles of refractory bricks, metal plates, cardboard inserts, etc., must be maintained. These stock piles present undesirable materials handling problems and the maintenance of several materials inventories. Furthermore, because the several materials forming the lining must be assembled during actual construction of the furnace-lining errors in installation frequently occur. Such errors in installation can easily result in undesirable mechanical failure of the portions of the refractory lining. In order to be assured of proper installation, resort is generally made to costly inspection procedures.

An object of this invention is to provide for improved furnace-lining construction.

Another object of this invention is to provide improved refractory units for furnace-lining construction.

A further object of the invention is the provision of an improved furnace-lining unit which provides for greatly simplified installation and improved compensation for expansion of all types in furnaces operated at high temperatures.

Still another object of this invention is an improved curved furnace-lining which provides for substantially uniform expansion in more than a single direction, thereby effectively inhibiting cracking and spalling of the refractory lining.

These and other objects of this invention will become more clearly apparent from a consideration of this specification, claims and the attached drawings in which:

FIG. 1 is a perspective view of a refractory furnace-lining unit according to this invention.

FIG. 2 is an enlarged sectional view of the unit of FIG. 1, the section being taken along the line 2—2.

FIG. 3 is a fragmentary elevation of the lining of a furnace formed of refractory units of the type illustrated in FIG. 1.

FIG. 4 is a perspective view of a refractory furnace-lining unit for curved construction according to this invention.

FIG. 5 is a perspective view of a corrugated metal plate of the type attached to a trapezoidal side of the refractory body portion of the refractory unit of FIG. 4.

FIG. 6 is a perspective view of a corrugated metal plate of the type attached to a rectangular side of the refractory body portion of the refractory unit of FIG. 4.

FIG. 7 is a sectional view of the metal plate of FIG. 6 taken along the line 7—7.

FIG. 8 is a fragmentary elevation of a lining of a rotary kiln formed of refractory units of the type illustrated in FIG. 4.

FIG. 9 is a sectional view of the furnace-lining of FIG. 8 this section being taken along the line 9—9.

FIG. 10 is an enlarged sectional view of the furnace-lining of FIG. 8, the section being taken along the line 10—10.

FIG. 11 is a perspective view of another type of furnace-lining unit for curved construction according to this invention.

FIG. 12 is an enlarged sectional view of the refractory unit of FIG. 11, the section being taken along the line 12—12.

According to this invention there is provided a novel furnace-lining unit comprising a solid refractory body portion of generally rectangular, trapezoidal or other suitable cross section having flat side surfaces and two ends, and an oxidizable metal plate adhering to at least one of the side surfaces so as to project outwardly therefrom, the plate having an offset area throughout a substantial portion thereof. According to a preferred form of the invention, several of the side surfaces of the refractory body portion are each provided with a separate oxidizable metal plate and these plates are provided with a plurality of transverse corrugations.

It was found that by means of the novel refractory units of this invention a furnace-lining can be constructed which provides adequate compensation not only for thermal expansion but for those delayed forms of expansion caused by crystalline growth where metal plates are present and by alteration of brick composition by means of the hot furnace contents.

In addition, the improved furnace-lining units of this invention have a number of other distinct advantages over refractory bricks and separate plates heretofore employed and obviates a number of prior art difficulties in furnace wall construction. The metal plates are secured to the refractory body at the manufacturing plant so that the plates form an integral part of the refractory unit. Thus, each unit, with the metal plates thereon, can be handled and transported without danger of displacement of the plates, and this desirable condition continues during the handlnig of the rerfactories incidental to the actual installation of the furnace walls. By reason of the plates forming an integral part of the refractory units, materials handling problems are greatly simplified and materials inventories may be reduced to a minimum. Furthermore, installation is greatly simplified since single units, rather than bricks and separate plates, are the only material that need be employed.

Referring to the drawings, FIG. 1 illustrates a refractory unit 1 of this invention comprising an elongated refractory body portion 2 of generally rectangular cross section having four relatively flat side surfaces 3 and two ends 4. The refractory body may take other forms, as for example it may be wedge-shaped, cubic, and the like; however, in FIG. 1, the refractory body portion is substantially in the form of a rectangular parallelepiped. Refractory body portion 2 may be formed of any suitable rerfactory material, or example a basic refractory material such as magnesia, chrome-magnesia, magnesia-chrome, forsterite, and the like. The refractory body portion may be burned or unburned depending upon service requirements.

Superimposed upon and adhered to one or more of side surfaces 3 so as to project outwardly therefrom are oxidizable metal plates 5. Metal plates 5 may be adhered to body portion 2 by any suitable means, as for example adhesive means, which provides a strong bond to prevent displacement of the plate during handling in shipment and in installation. If an adhesive is employed, preferably it is one which sets rapidly without the application of heat. Suitable adhesives include silicates, and various resins and rubbers, both natural and synthetic.

In the figure plates 5 terminate just short of the edges of the sides to which they adhere, so that between adjacent edges of the plates on adjacent sides of the body portion an arris of the body portion lies exposed. However, the plates may extend to the edges of the sides so that each plate substantially coextensive with the side to which it adheres.

Extending transversely of plates 5 are corrugations or offset areas 6. Although in the plates illustrated in FIG. 1 these corrugations are shown to be four in number, there may be a greater or lesser number. The corrugations or offset areas 6 are capable of being flattened out or collapsed by the several types of expansion heretofore described, thereby providing means to compensate for such expansion. The corrugations will not all be collapsed to the same degree, those at the hot end of the refractory unit, where expansion is greatest being collapsed to a greater degree than those toward the cooler end of the refractory unit. Thus, application of a destructive load to the weakened hot ends of the units is prevented because the offset areas away from the hot ends of the units retain sufficient strength to support the wall and serve to transfer a major portion of the load to the stronger cooler portions of the units. Metal plates 5 are of sufficient thickness, however, to insure that the corrugations are not flattened under substantial loads at ordinary temperatures.

Preferably corrugations 6 of plates 5 are provided with relatively flat surfaces 7; likewise the surfaces of the plate between and adjacent offset areas 6 are preferably flat. These flat surfaces between and adjacent the offset areas provide for greater areas of adhesion between the refractory body portion 2 and the plates than that provided by tangential or line contact of the type provided by a curved surface. This feature is more clearly illustrated in FIG. 2.

In FIG. 1 plates 5 are shown attached to the two visible sides of body portion 2, however plates may be attached to one or several, for example all, of the sides. According to a preferred form of the invention plates 5 are attached to only two sides, the sides being adjoining sides. When units of this preferred type are placed one upon the other to form a wall, so that each side of the refractory body portion, having an adhering metal plate, of each unit is adjacent a side comprising the refractory body portion of an adjacent unit, a single metal plate advantageously is present in every joint between the unit. Construction of a portion of a refractory lining with units of this preferred type arranged in the manner stated is illustrated in FIG. 3. As can be seen from this figure there is a metal plate 5 in every joint and the units 1 are spaced apart by the offset areas 6 so that in both a horizontal and vertical direction space is provided for expansion of each individual refractory unit.

The depth of the offset areas 6 is such as to provide not only for thermal expansion but also for expansion due to crystalline growth and change in composition of the hot faces of the refractory body portion of the units.

In FIG. 1, the corrugations or offset areas 6 are shown as extending transverse to the length of plates 5. According to this preferred embodiment of the invention the corrugations not only function to compensate for the several types of expansions heretofore discussed, but also effectively seal each joint between adjacent units regardless of the degree of expansion of the units. This has the advantage of preventing heat loss by reason of cooler air gaining entrance to the furnace through openings extending between units. Furthermore, these transverse corrugations prevent any material in the furnace from entering the joints between the units, which material might cause undesirable expansion by reaction with the refractory composition. Although transverse corrugations are prefered; nevertheless, the corrugations or offset areas may extend longitudinally of the plates as for example in the manner illustrated in FIGS. 4–6. In units for use in constructing vertical wall sections, the depth of the offset areas 6 preferably are all of the same magnitude; however, with wedge-shaped units according to this invention, hereinafter discussed, the depth of the offset areas may be of varying magnitude. Although the metal plates illustrated in FIG. 1 are provided with offset areas or corrugations providing relatively flat surfaces such corrugations may present curved surfaces. Also, the offset areas may take other forms, such as rows of projections of any suitable shape, but preferably presenting flat surfaces.

According to this invention there is also provided a refractory furnace-lining unit for curved construction comprising a solid refractory body portion having a larger end and a smaller end, two opposing substantially parallel trapezoidal sides and two opposing substantially rectangular sides, an oxidizable metal plate adhering to a rectangular side and an oxidizable metal plate adhering to a trapezoidal side of said body portion so as to project outwardly therefrom, each of said plates having offset areas extending through a substantial portion thereof.

It will be observed by reference to FIG. 4 that only two sides of the refractory body portion are provided with metal plates. In forming a curved furnace lining, such as that of a rotary kiln illustrated in FIGS. 8–10, the refractory units may advantageously be placed one upon the other so that there is only a single metal plate in each joint, trapezoidal sides of the units forming circumferential joints and rectangular sides forming radial joints.

Substantially an entire curved furnace wall of given diameter may be comprised of a single size refractory unit. Where required, however, refractory units of the type herein described which are somewhat smaller than the standard unit so that their tapered opposing rectangular faces are somewhat closer together, say for example, two thirds or three quarters the distance these sides are apart in the standard unit, may be used for keying out, to present the units forming the curved lining in a tight condition when cold. By means of these thinner refractory units, the problem of undesirable crystalline growth in joints due to the use of a large number of metal plates in certain joints to tighten the cold brick wall structure is avoided. Also, by the use of a proper combination of these refractory units, cutting of special shapes to aid in keying out is avoided.

Preferably the larger end of the refractory units are substantially square and the edges thereof are about 4½ in. in length. Because rotary kilns and the like have substantial diameters, for example for about 6 to 12 feet, which diameters are many times the length of the refractory units, the substantially rectangular sides of the units are only slightly tapered from the larger end to the smaller end. Thus, the smaller end of each refractory unit is only slightly smaller than the larger end, the difference in size being least in units designed for use in lining larger diameter, e.g. 12 ft. diameter, kilns. By reason of the larger end being square, the smaller end, which is closer to the source of heat in the furnace and thus undergoes the greater expansion, closely approximates a substantially square surface, and therefore is caused to expand substantially uniformly in both a longitudinal and circumferential direction, which is extremely desirable to prevent cracking and spalling of the refractory lining.

In present day curved furnace-lining construction, particularly that of rotary kilns, refractory rings generally comprise a plurality of wedge-shaped refractory bricks whose larger end is about 9″ x 3″. Thus, by providing the larger square end of the refractory units of this invention with edges 4½″ in length, individual rings of worn out 9″ x 3″ refractory bricks can readily be replaced by the new units without removal of any bricks other than those to be replaced. Furthermore, units of this invention having a 4½″ x 4½″ larger end fit furnace shell irregularities much better than do 9″ x 3″ bricks.

It will be realized that in the foregoing discussion relating to the ends of the refractory units, the configuration of the ends and dimensions thereof are for the completed units comprising the refractory body portion and adhering plates.

The metal plates, having offset portions, are sufficiently strong when cold to support the weight of the lining and maintain the relative positions of the units forming the lining. The plates are so designed, however, that their yield point is lower than the yield point of the refractory body portion of the units so that as the units expand, the plates are flattened, but the rigidity of the structure is maintained, with no undue strain placed upon the refractory structure.

Referring now to FIGS. 4–7, wherein like elements are represented by the same number, the improved refractory units of this invention comprise a refractory body portion 10 of suitable basic refractory material, such as magnesia, chrome-magnesia, magnesia-chrome, forsterite, and the like, which may be burned or unburned, depending upon service requirements. Body portion 10 is rectangular in cross section and is provided with a smaller end 12 and a larger end 14. Larger end 14 is preferably dimensioned so that when metal plates of a predetermined thickness having offset portions, as hereinafter described, are adhered to two adjacent sides of the body, the larger end will be substantially square.

Refractory body 10 is also provided with two opposing substantially rectangular sides 16 and two opposing substantially trapezoidal sides 18. Thus, body 10 is substantially wedge-shaped due to the taper of rectangular sides 16. By reason of the wedge-shaped configuration, it is readily adapted to fit into circular construction.

The length of the body and the degree of taper may be varied depending upon the diameter of the circular or arcuate furnace portion in which it is to be employed.

A metal plate 20 is attached to side 16 and a metal plate 22 is attached to side 18 so as to project outwardly therefrom by suitable means preferably an adhesive of the type heretofore mentioned.

Preferably plates 20 and 22 terminate short of the width of the sides to which they adhere so that between the adjacent edges of the plates an arris of the refractory body lies exposed. Also, the plates preferably extend from the smaller end of the refractory body 10 and terminate a short distance from the larger end thereof. By so doing, the metal plates are prevented from coming into contact with the furnace shell, which may be of metal construction, thus preventing conduction of heat through the plates to the shell.

Although plates may be adhered to one or more sides of refractory body portion 10, plates preferably are adhered to only two adjacent sides so that there will be only a single metal plate in each radial and each circumferential joint between units when the units are properly assembled as illustrated in FIGS. 8–10.

Referring more particularly to FIGS. 6 and 7, wherein a metal plate 20 similar to plate 20 of FIG. 4 is illustrated in greater detail, it will be observed that the plate is substantially rectangular in plan, one end 24 of which presents a generally flat plane surface. Extending from the other end of the plate are a series of longitudinal, wedge-shaped offset areas or corrugations 26, herein shown to be three in number, although obviously any desired number of such offset areas may be provided within the scope of the invention. The offset areas 26 are greatest in magnitude along the edge A—B of the plate and the magnitude of the offset becomes gradually less in the direction toward the flat portion 24, tapering off and fading into the face of the plate approximately along the line C—D, the balance of the plate being flat as previously indicated. When plate 20 is attached to a rectangular side of the body 10, preferably the offset areas extend substantially throughout the length of the plate, the remainder of the plate being substantially flat. While the width of the offset areas 30 has been shown to be substantially constant from end to end, it is obvious that the width may also progressively decrease in the direction toward the flat portion 24.

In FIG. 5 there is illustrated a plate 22 for attachment to a trapezoidal side of the refractory body 10. Metal plate 22 is substantially trapezoidal in plan, and extending from one end to the other of the plate are a series of longitudinal offset areas or corrugations 28, herein shown to be two in number, although obviously any desired number of such offset areas may be provided. Offset areas 28 are of substantially constant magnitude throughout the length of the plate.

According to a preferred embodiment of the invention illustrated in the figures, the offset areas of plates 20 and 22 are provided with relatively flat surfaces 30 and 32, respectively. Likewise, the surfaces between offset areas are preferably flat. Although the metal plates illustrated in the drawing are provided with longitudinally extending offset areas or corrugations providing relatively flat surfaces, obviously such corrugations may present curved surfaces.

Rather than corrugations as illustrated in the drawings, the offset areas may take other forms, for example rows of projections of any suitable configuration, but preferably presenting flat surfaces.

In FIGS. 8–10 is illustrated a section of a lining of a rotary kiln formed of the refractory units of the type illustrated in FIG. 4. The wall section comprises a plurality of such units laid one upon the other so that each rectangular side of the body portion of each unit having an adhered adhering metal plate 20 is adjacent a rectangular side of the refractory body portion of a next adjacent unit. Likewise, each trapezoidal side of the body portion of each unit having an adhered metal plate 22 is adjacent a trapezoidal side of the refractory body portion of a next adjoining unit. In this construction opposing rectangular sides of adjacent units form radial joints and opposing trapezoidal sides of adjacent units form circumferential joints. Advantageously there is but a single metal plate in each joint between adjacent units and thus difficulties arising from crystalline growth due to the formation of excess metal oxide in joints on heating are obviated. The units may be laid in the manner illustrated in FIG. 8, or they may be laid with the joints staggered, see FIG. 3.

In FIGS. 8–10, a preferred form of the units of this invention is illustrated in which each of the smaller ends of the units comprising end 12 of the refractory body and plates 20 and 22 approximate a substantially square surface. Thus, these ends of the units which are closer to the source of heat and thus expand to a greater degree, are caused to expand substantially uniformly in both a circumferential and longitudinal direction, thereby minimizing cracking and spalling of the lining.

In FIGS. 9 and 10, it will be observed that plates 20 and 22 terminate a short distance from the larger ends of the units which abut on the metal shell 34 of the kiln. Thus, there advantageously is no conduction of heat through the plates to the shell.

In one form of the invention, the offset areas of the plate adhered to a rectangular side of the wedge-shaped body portion may be coextensive with the length of the plate and be of substantially constant magnitude, as are the offset areas in a plate adhered to a trapezoidal side; tapered offset areas, however, are preferred.

In FIGS. 11 and 12, another preferred form of wedge-shaped unit for curved construction is illustrated. The unit shown is substantially similar to that illustrated in FIG. 4 with the exception that the plates adhered to the body portion are provided with corrugations which extend transversely to the length of the unit. Unit 40, thus, comprises a refractory body portion 42 having a smaller end 44 and a larger end 46. The refractory body portion also has rectangular flat side surfaces 48 and substantially parallel trapezoidal side surfaces 50. Adhered to a rectangular side surface 48 of the body portion is a rectangular metal plate 54 whose edges terminate just short of the edges of the side to which it adheres. A plate 52 which is substantially trapezoidal in shape adheres to trapezoidal side surface 50, and the edges of this plate also terminate just short of the edges of the refractory side surface.

Plate 54 is provided with a plurality of offset areas 56 which extend transversely entirely across the face of plate 54. Referring more particularly to FIG. 12, it can be seen that the depth of offset areas 56 of plate 54 progressively decrease in magnitude from the smaller end of the refractory body portion, the transverse corrugation of greatest magnitude being adjacent the edge forming the smaller end of the refractory body portion and the succeeding corrugations decreasing in magnitude so that the corrugation farthest removed from the smaller end is of substantially less depth than the corrugation at the smaller end of the refractory unit. Although corrugations of decreasing magnitude are preferred, the corrugations may all be of the same depth.

Plate 52 is likewise provided with transverse corrugations 60 which also extend entirely across the plate, the corrugations all being of the same depth.

The corrugations illustrated all present flat surfaces such as flat surfaces 58 in plate 54 and flat surfaces 62 in plate 52. The remainder of plates 52 and 54 is preferably a flat surface for the purpose of obtaining greater adhesion to the refractory body portion.

A particular advantage of the unit illustrated in FIG. 11 is that the transverse corrugations act as a seal to prevent the material being treated, as for example in a rotary kiln, from entering joints between adjacent units during operation of the kiln. By so excluding the material being treated from the joints the spaces defined by the corrugations are prevented from being filled with such material which would interfere with the desired collapsing of the offset areas in providing expansion relief, and reaction between the refractory and material being treated is limited to the exposed ends of the refractory.

From the foregoing description, it can be seen that the improved refractory units of this invention provide compensation for expansion of all types and in all directions, and cracking and fracturing of the units due to expansion is obviated.

Although only preferred forms of the invention have been shown and described in detail, it will be apparent to those skilled in the art that the invention is not so limited, but that various changes can be made therein without departing from the scope of the appended claims.

What is claimed is:

1. A refractory furnace-lining unit for curved construction comprising a solid refractory body portion having a larger end, a smaller end, two oppositing substantially parallel trapezoidal flat sides and two opposing substantially rectangular flat sides, an oxidizable metal plate superimposed upon and adhesively secured to a rectangular side and an oxidizable metal plate superimposed upon and adhesively secured to a trapezoidal side of said body portion so as to project outwardly therefrom, each of said plates being substantially coextensive with but terminating just short of the edges of the side of the body portion to which it adheres each of said metal plates having corrugations extending from its own edge adjacent the smaller end of said refractory body portion toward its opposite edge, the corrugations in said plate adhering to a trapezoidal side being of substantially constant magnitude measured in a plane normal to the plane including said plate, and the corrugations in said plate adhering to a rectangular side being of greatest magnitude, measured in a plane normal to the plane including said plate, adjacent the smaller end of said body portion and gradually and progressively decreasing in magnitude with distance toward the larger end of said body portion, said corrugations being disposed substantially normal to the ends of said body portion and presenting relatively flat raised surfaces, the remainder of said plates being substantially flat and being in surface contact with the flat sides of said body portion.

2. A refractory furnace-lining unit according to claim 1 in which the larger end of said unit comprises a substantially square surface and the smaller end approximates a substantially square surface, and said body portion comprises a basic refractory material.

3. In furnace-lining construction, a curved wall section including a series of refractory furnace-lining units, each of said units comprising a solid refractory body portion having a larger end, a smaller end, two opposing substantially parallel, flat trapezoidal sides and two opposing substantially rectangular, flat sides, an oxidizable metal plate superimposed upon and adhesively secured to a rectangular side and an oxidizable metal plate superimposed upon and adhesively secured to a trapezoidal side of said body portion so as to project outwardly therefrom, each of said plates being substantially coextensive with but terminating just short of the edges of the side of the body portion to which it adheres each of said metal plates having corrugations extending from its edge adjacent the smaller end of said refractory body portion toward its opposite edge, said corrugations in said plate adhering to a trapezoidal side being of substantially constant magnitude measured in a plane normal to the plane including said plate, and said corrugations in said plate adhering to a rectangular side being of greatest magnitude, measured in a plane normal to the plane including said plate, adjacent the smaller end of said body portion and gradually and progressively decreasing in magnitude with distance toward the larger end of said body portion, said corrugations being disposed substantially normal to the ends of said body portion presenting relatively flat raised surfaces, the remainder of said plates being substantially flat and being in surface contact with the flat sides of said body portion, said units being laid one upon the other, with each rectangular side of the body portion of each unit having an adhered metal plate being adjacent a rectangular side of the refractory body portion of a next adjacent unit, and each trapezoidal side of the body portion of each unit having an adhered metal plate being adjacent a trapezoidal side of the refractory body portion of its next adjacent unit, the smaller ends of said units forming a wall surface.

4. Refractory furnace-lining construction according to claim 3 in which the larger end of each unit comprises a substantially square surface and the smaller end of each unit approximates a substantially square surface, and said body portion comprises a basic refractory material.

5. A furnace lining construction as defined in claim 3 wherein the solid refractory body portion of each unit is comprised of a basic refractory material.

6. A furnace lining construction as defined in claim 3, wherein the larger end of each unit comprises a substantially square surface and the smaller end thereof comprises a substantially square surface.

References Cited in the file of this patent

UNITED STATES PATENTS

| 833,455 | Gerald | Oct. 16, 1906 |
| 2,148,054 | Berlek | Feb. 21, 1939 |
| 2,192,642 | Griffith | Mar. 5, 1940 |
| 2,216,813 | Goldschmidt | Oct. 8, 1940 |
| 2,829,877 | Davis | Apr. 8, 1958 |
| 2,853,872 | Samuel | Sept. 30, 1958 |
| 2,915,893 | Wilkins | Dec. 8, 1959 |

FOREIGN PATENTS

| 517,443 | Great Britain | Jan. 30, 1940 |
| 50,369 | Netherlands | May 15, 1941 |